(12) United States Patent
Nakayama et al.

(10) Patent No.: US 10,454,322 B2
(45) Date of Patent: Oct. 22, 2019

(54) DYNAMO-ELECTRIC MACHINE

(71) Applicant: Hitachi Automotive Systems, Ltd., Hitachinaka-shi, Ibaraki (JP)

(72) Inventors: Kenichi Nakayama, Hitachinaka (JP); Naoki Nishikawa, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 326 days.

(21) Appl. No.: 15/634,350

(22) Filed: Jun. 27, 2017

(65) Prior Publication Data
US 2018/0375393 A1 Dec. 27, 2018

(51) Int. Cl.
| | |
|---|---|
| *H02K 1/16* | (2006.01) |
| *H02K 3/12* | (2006.01) |
| *H02K 9/10* | (2006.01) |
| *H02K 9/19* | (2006.01) |
| *H02K 3/28* | (2006.01) |
| *H02K 3/50* | (2006.01) |
| *H02K 5/20* | (2006.01) |

(52) U.S. Cl.
CPC .............. *H02K 1/165* (2013.01); *H02K 3/12* (2013.01); *H02K 3/28* (2013.01); *H02K 3/50* (2013.01); *H02K 5/20* (2013.01); *H02K 9/10* (2013.01); *H02K 9/19* (2013.01)

(58) Field of Classification Search
CPC ............ H02K 1/165; H02K 3/12; H02K 3/50; H02K 5/20; H02K 9/10
See application file for complete search history.

(56) References Cited

U.S. PATENT DOCUMENTS

| | | | | |
|---|---|---|---|---|
| 7,521,828 | B2* | 4/2009 | Ogawa | H02K 3/38 310/179 |
| 2011/0181143 | A1 | 7/2011 | Hasegawa et al. | |
| 2018/0233969 | A1* | 8/2018 | Chaillou | H02K 3/493 |
| 2018/0294686 | A1* | 10/2018 | Sawada | H02K 3/04 |
| 2018/0375393 | A1* | 12/2018 | Nakayama | H02K 1/165 |

FOREIGN PATENT DOCUMENTS

| | | |
|---|---|---|
| JP | 2010-112993 A | 5/2010 |
| JP | 2011-151975 A | 8/2011 |

* cited by examiner

*Primary Examiner* — Robert W Horn
(74) *Attorney, Agent, or Firm* — Crowell & Moring LLP

(57) ABSTRACT

The heat dissipation of a coil of a stator is enhanced. A stator of a dynamo-electric machine or a dynamo-electric machine according to the present invention includes: a stator core in which a plurality of slots arranged in the circumferential direction are formed; and a stator coil with an insulating film inserted in the slots in the stator core. The stator coil is composed of a first-layer segment to a fourth-layer segment each of which is formed by arranging a plurality of segment coils in the circumferential direction and which are arranged from the inner radius side to the outer radius side in the radial direction. The first-layer segment and the second-layer segment are displaced from each other by a first amount of displacement in the circumferential direction and connected to each other. The third-layer segment and the fourth-layer segment are displaced from each other by a second amount of displacement different from the first amount of displacement in the circumferential direction and connected to each other.

6 Claims, 16 Drawing Sheets

DYNAMO-ELECTRIC MACHINE

FIELD OF THE INVENTION

The present invention relates to a stator of a dynamo-electric machine and a dynamo-electric machine using the stator and in particular to a dynamo-electric machine generating torque for running of an automobile or generating electricity during braking.

BACKGROUND OF THE INVENTION

In dynamo-electric machines, a rotating magnetic field is produced by supplying alternating-current power to a stator winding and a rotor is rotated by this rotating magnetic field. In addition, alternating-current power can be outputted from a coil by converting mechanical energy applied to a rotor into electric energy. Thus, a dynamo-electric machine operates as an electric motor or a generator.

As a stator of such a dynamo-electric machine, there is known one so configured that the ends of segment coils are connected by welding (Refer to Japanese Patent Laid-Open No. 2011-151975, for example.). A dynamo-electric machine in which power up owing to temperature reduction can be achieved and further magnetic noise can be reduced by alternatively arranging a stator coil on the inner wall faces of slots along the radial direction (Refer to Japanese Patent Laid-Open No. 2010-112993, for example.).

SUMMARY OF THE INVENTION

When this type of a dynamo-electric machine is mounted in an automobile, the dynamo-electric machine is installed in a limited narrow space; therefore, the dynamo-electric machine must be reduced in size. With respect to the upper parts of coil ends, it is desirable to reduce the coil end height at a welded portion in a segment portion to ensure a gap between the upper parts of the coil ends and a transmission portion. In addition, since stress produced at a welded portion due to a temperature change is problematic, a welding area must be increased to enhance weld strength.

A stator of a dynamo-electric machine or a dynamo-electric machine in accordance with the present invention includes: a stator core with a plurality of slots formed therein in alignment in the circumferential direction; and a stator coil covered with an insulating film inserted into the slots in the stator core. The stator coil is composed of: a first-layer segment to a fourth-layer segment each constructed by arranging a plurality of segment coils in the circumferential direction, the segments being arranged from the inner radius to the outer radius in the radial direction. The first-layer segment and the second-layer segment are connected with each other, displaced in the circumferential direction by a first amount of displacement; and the third-layer segment and the fourth-layer segment are connected with each other, displaced in the circumferential direction by a second amount of displacement different from the first amount of displacement.

DETAILED DESCRIPTION OF THE PREFERRED EMBODIMENTS

Figure 16:
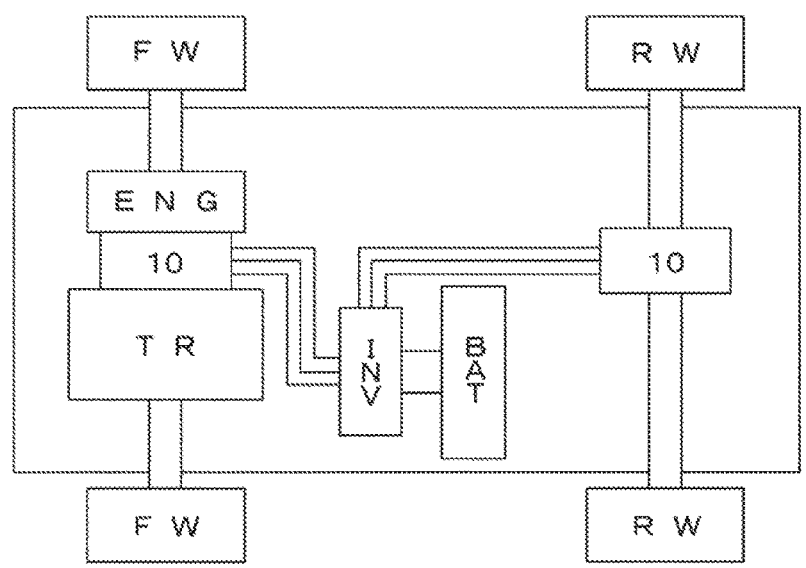
FIG. 16 is a drawing illustrating a general configuration of a hybrid electric vehicle mounted with a dynamo-electric machine 10 in the present embodiment.

Hereafter, a description will be given to an embodiment in which the present invention is implemented with reference to FIG. 16. A dynamo-electric machine 10 in this embodiment is suitable for use in running of an automobile. There are two types of so-called electric vehicles using the dynamo-electric machine 10: hybrid-type electric vehicles (HEV) mounted with both an engine ENG and the dynamo-electric machine 10 and sheer electric vehicles (EV) running only with the dynamo-electric machine 10 without use of an engine ENG. Since the dynamo-electric machine described hereafter is applicable to both types, the following description will be based on a dynamo-electric machine used in a hybrid-type automobile as a representative example.

In the following description, the term of "axial direction" denotes a direction along the rotating shaft of the dynamo-electric machine. The term of "circumferential direction" denotes a direction along the direction of rotation of the dynamo-electric machine. The term of "radial direction" denotes the direction of a moving radius (radial direction) around the rotating shaft of the dynamo-electric machine. The term of "inner circumferential side" denotes inside in the radial direction (inside diameter side) and "outer circumferential side" denotes a side opposite thereto, that is, outside in the radial direction (outside diameter side).
(General Configuration of Vehicle)

A description will be given to a general configuration of a vehicle mounted with the dynamo-electric machine with reference to FIG. 16. As main power sources on the front wheel side, an engine ENG and a dynamo-electric machine 10 are provided. Power generated by the engine ENG and the dynamo-electric machine 10 is shifted by a transmission TR and transmitted to front driving wheels FW. To drive rear wheels, a dynamo-electric machine 10 placed on the rear wheel side and rear driving wheels RW are mechanically connected and power is transmitted. The dynamo-electric machine 10 as a front wheel-side power source is placed between the engine ENG and the transmission TR.

The dynamo-electric machine 10 starts the engine ENG and switches between generation of driving force and generation of power obtained by recovering energy produced during vehicle braking as electric energy according to the state of running. Driving operation and power generating operation of the dynamo-electric machines 10 are controlled by a power converter INV in accordance with the driving condition of the vehicle such that torque and a number of revolutions are optimized. Power required to drive the dynamo-electric machines 10 is supplied from a battery BAT via the power converter INV. During power generating operation of the dynamo-electric machines 10, the battery BAT is charged with electric energy via the power converter INV.

Each of the dynamo-electric machines 10 is a three-phase synchronous motor with built-in permanent magnets. When their stator coils are supplied with a three-phase alternating current, the dynamo-electric machines 10 operate as an electric motor rotating a rotor. When driven by the engine ENG, the dynamo-electric machines 10 operate as a generator and output three-phase alternating-current generated power. That is, the dynamo-electric machines 10 have both functions of an electric motor generating rotating torque based on electric energy and functions of a generator generating electricity based on mechanical energy. These functions can be selectively utilized according to the state of running of the vehicle.
(Explanation of Dynamo-Electric Machine 10)

Figure 1:
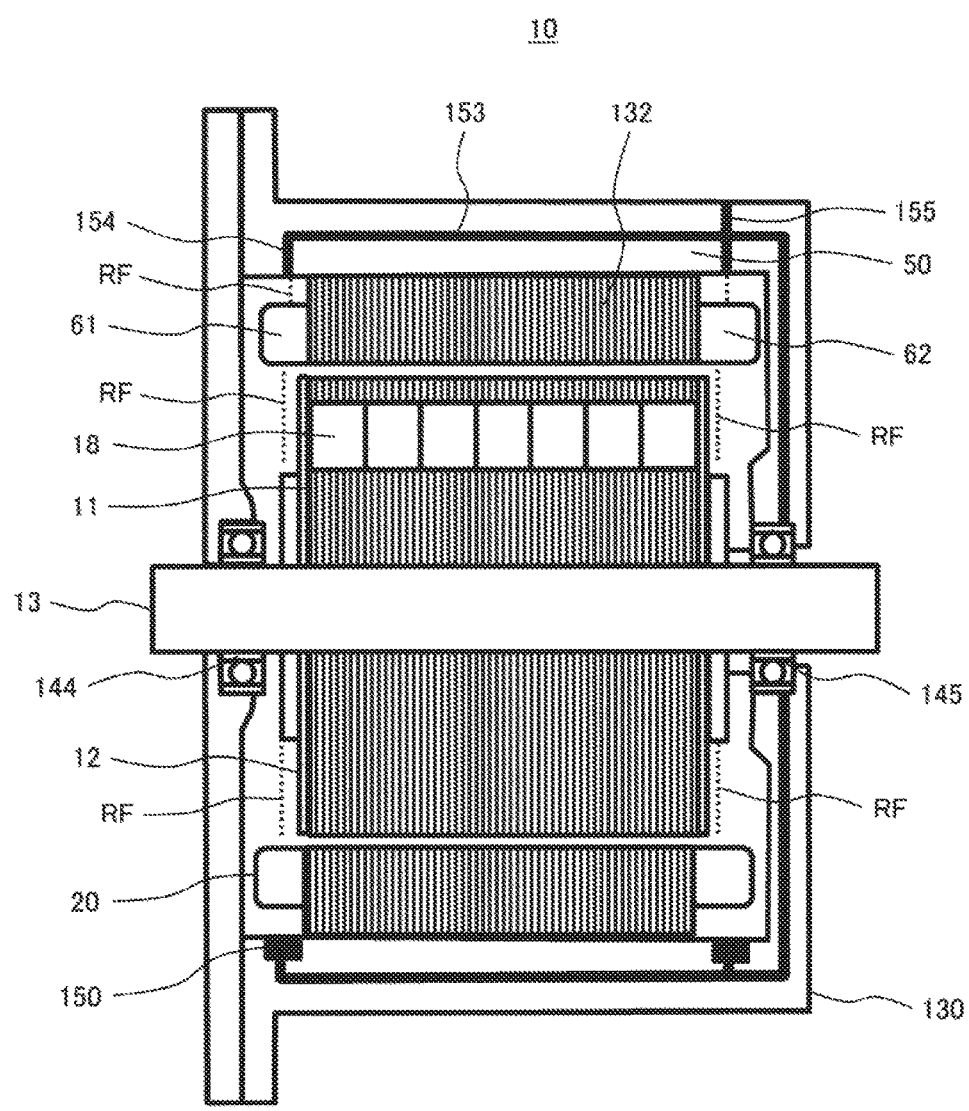
FIG. 1 is a sectional view of a dynamo-electric machine 10 in an embodiment.

FIG. 1 is a sectional view of a dynamo-electric machine 10 in this embodiment. In this embodiment, the dynamo-electric machine 10 is placed in a liquid-cooled jacket 130. The liquid-cooled jacket 130 is constructed of the case of the engine ENG or the case of the transmission TR. The dynamo-electric machine 10 includes a stator 20, a housing 50 holding the stator 20, and a rotor 11.

The liquid-cooled jacket 130 is secured on the outer circumferential side of the housing 50. The inner circumferential wall of the liquid-cooled jacket 130 and the outer circumferential wall of the housing 50 constitute a refrigerant passage 153 for such liquid refrigerant RF as oil. A shaft 13 on which the rotor 11 is secured is rotatably supported by a bearing 144 and a bearing 145 provided on the liquid-cooled jacket 130. For this reason, the liquid-cooled jacket 130 is also referred to as bearing bracket.

In case of direct liquid cooling, the liquid refrigerant RF accumulated in a refrigerant storage space 150 goes through the refrigerant passage 153 and flows out toward the stator 20 by way of a refrigerant passage 154 and a refrigerant passage 155, thereby cooling the stator 20. The refrigerant RF may be a cooling oil.

The stator 20 is secured on the inner circumferential side of the housing 50. The rotor 11 is rotatably supported on the inner circumferential side of the stator 20. The housing 50 is formed into a cylindrical shape by cutting such an iron-based material as carbon steel, casting cast steel or an aluminum alloy, or press working and constitutes the casing of the dynamo-electric machine 10. The housing 50 is also referred to as frame body or frame.

The housing 50 is formed into a cylindrical shape by drawing a steel plate (high-tensile steel plate or the like) approximately 2 to 5 mm in thickness. The housing 50 is provided with a plurality of flanges (not shown) attached to the liquid-cooled jacket 130. The flanges are projected outward in the radial direction at the rim of an end face of the cylindrical housing 50. The flanges are formed by cutting off the other portions than the flanges in an end portion formed during drawing and integrated with the housing 50. The stator 20 may be secured directly on the liquid-cooled jacket 130 as a case without providing the housing 50.

Figure 2:
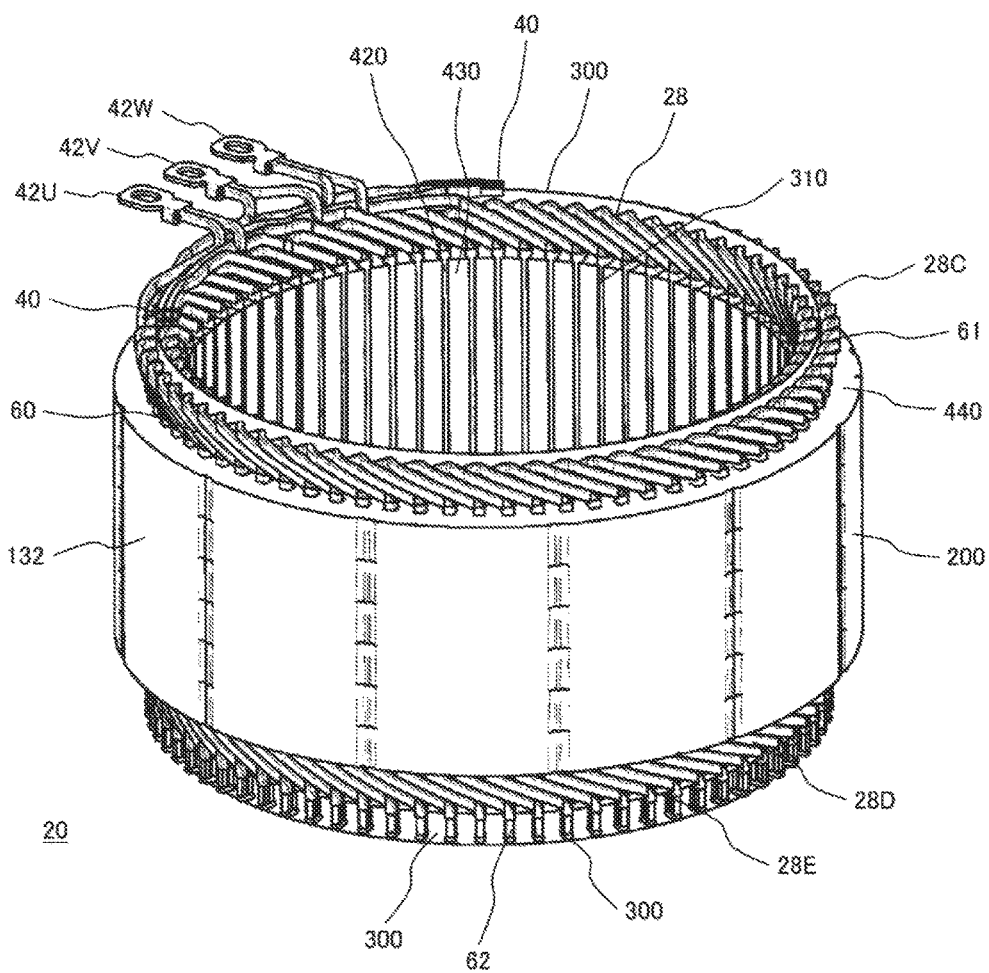
FIG. 2 is an overall perspective view of a stator 20.
Figure 3:
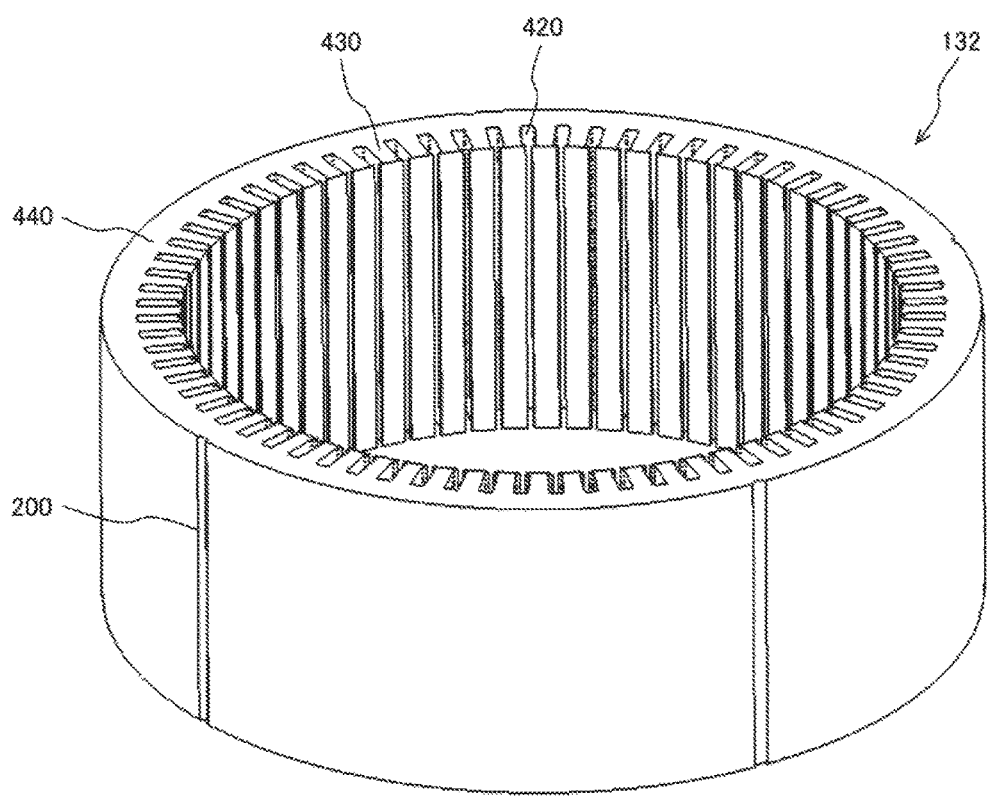
FIG. 3 is an overall perspective view of a stator core 132.

FIG. 2 is an overall perspective view of the stator 20. FIG. 3 is an overall perspective view of a stator core 132. As shown in FIG. 2, the stator 20 is composed of the stator core 132 and a stator coil 60. The stator core 132 is formed by laminating thin silicon steel plates. The stator coil 60 is wound in a large number of slots 420 provided in the inner circumferential portion of the stator core 132. Heat generated from the stator coil 60 is transferred to the liquid-cooled jacket 130 via the stator core 132 and dissipated by the refrigerant RF circulated in the liquid-cooled jacket 130.

Figure 4:
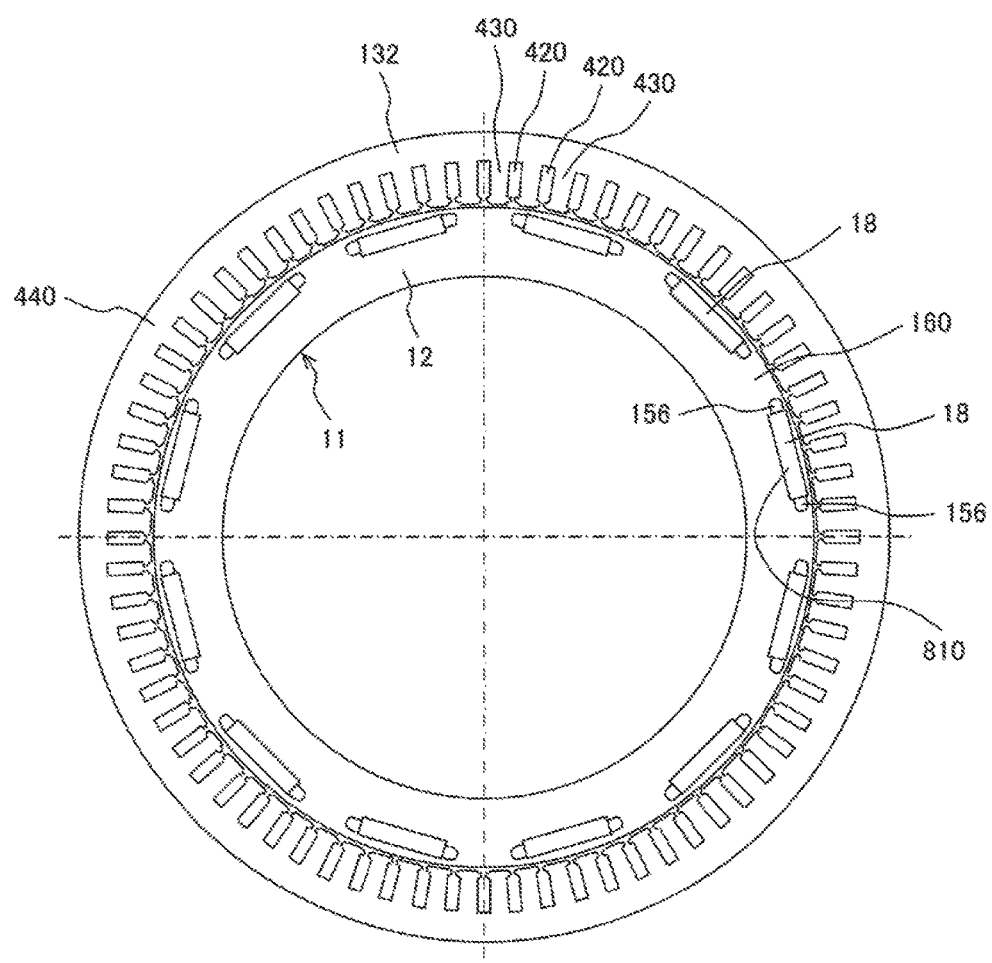
FIG. 4 is a sectional view illustrating sections of a rotor 11 and a stator core 132.

As shown in FIG. 1, the rotor 11 is composed of a rotor core 12 and the shaft 13. FIG. 4 is a sectional view illustrating sections of the rotor 11 and the stator core 132. In FIG. 4, a graphical representation of the shaft 13 is omitted. The rotor core 12 is formed by laminating thin silicon steel plates. The shaft 13 is secured in the center of the rotor core 12. As shown in FIG. 1, the shaft 13 is rotatably supported by the bearing 144 and the bearing 145 installed in the liquid-cooled jacket 130 and is rotated in a predetermined position in the stator 20 opposite the stator 20. Though not shown in the drawing, the rotor 11 is provided with a permanent magnet 18 and an end ring.

As shown in FIG. 3, in the stator core 132, a plurality of slots 420 parallel to the axial direction of the stator core 132 are formed at equal intervals in the circumferential direction. In this embodiment, for example, the number of the slots 420 is 72 and the above-mentioned stator coil 60 is housed in these slots 420. The inner circumferential side of each slot 420 is taken as an opening and the width of each opening in the circumferential direction is substantially equal to that of the coil installation portion of each slot 420 in which the stator coil 60 is installed or slightly smaller than that of the coil installation portion.

A tooth 430 is formed between the slots 420 and each tooth 430 is integrated with an annular core back 440. That is, the stator core 132 is configured as an integral-type core in which each tooth 430 and the core back 440 are integral molded. The teeth 430 guide a rotating magnetic field generated by the stator coil 60 to the rotor 11 to cause the rotor 11 to generate rotating torque.

The stator core 132 is formed by stamping an electromagnetic steel sheet approximately 0.05 to 1.0 mm in thickness and laminating a plurality of annularly formed electromagnetic steel sheets. A welded portion 200 is provided at the outer circumferential portion of the cylindrical stator core 132 in parallel to the axial direction of the stator core 132 by TIG welding, laser, or the like. The stator core 132 may be directly inserted into the case and secured thereby by swaging or the like without providing the welded portions 200.

FIG. 4 is a sectional view of the rotor 11 and the stator 20 obtained by cutting them in a direction perpendicular to the axial direction. In the rotor core 12, magnet insertion holes 810 into which a rectangular permanent magnet 18 is inserted are formed at equal intervals. A permanent magnet 18 is secured in each magnet insertion hole 810 by an adhesive, resin powder, mold, or the like. The width of each magnet insertion hole 810 in the circumferential direction is larger than the width of each permanent magnet 18 in the circumferential direction and a magnetic gap 156 is formed on both sides of each permanent magnet 18. These magnetic gaps 156 may be filled with an adhesive or may be filled with molding resin, which is in turn cured integrally with the permanent magnets 18. The permanent magnets 18 act to form field poles of the rotor 11. This embodiment is configured such that one magnetic pole is formed by one permanent magnet 18 but the permanent magnet 18 constituting each magnetic pole may be increased to more than one. When the permanent magnet 18 is increased in number, the magnetic flux density of each magnetic pole radiated by the permanent magnet and magnet torque can be increased.

The direction of magnetization of each permanent magnet 18 is oriented to the radial direction and the orientation of the direction of magnetization is inverted from field pole to field pole. That is, the stator-side face of a permanent magnet 18 for forming a magnetic pole is magnetized with the north pole and the shaft-side face thereof is magnetized with the south pole, the stator-side face of a permanent magnet 18 forming an adjacent magnetic pole is magnetized with the south pole and the shaft-side face thereof is magnetized with the north pole. These permanent magnets 18 are magnetized and arranged in the circumferential direction such that the direction of magnetization is alternated from magnetic pole to magnetic pole. In this embodiment, 12 permanent magnets 18 are placed at equal intervals and the rotor 11 forms 12 magnetic poles.

For the permanent magnets 18, a neodymium-based or samarium-based sintered magnet or ferrite magnet, a neodymium-based bonded magnet, or the like can be used. In this embodiment, an auxiliary magnetic pole 160 is formed between the permanent magnets 18 forming magnetic poles. These auxiliary magnetic poles 160 act to reduce the reluctance of q-axis magnetic flux generated by the stator coil 60. Since the reluctance of q-axis magnetic flux is made significantly smaller than the reluctance of d-axis magnetic flux by the auxiliary magnetic poles 160, large reluctance torque is generated.

Figure 5:
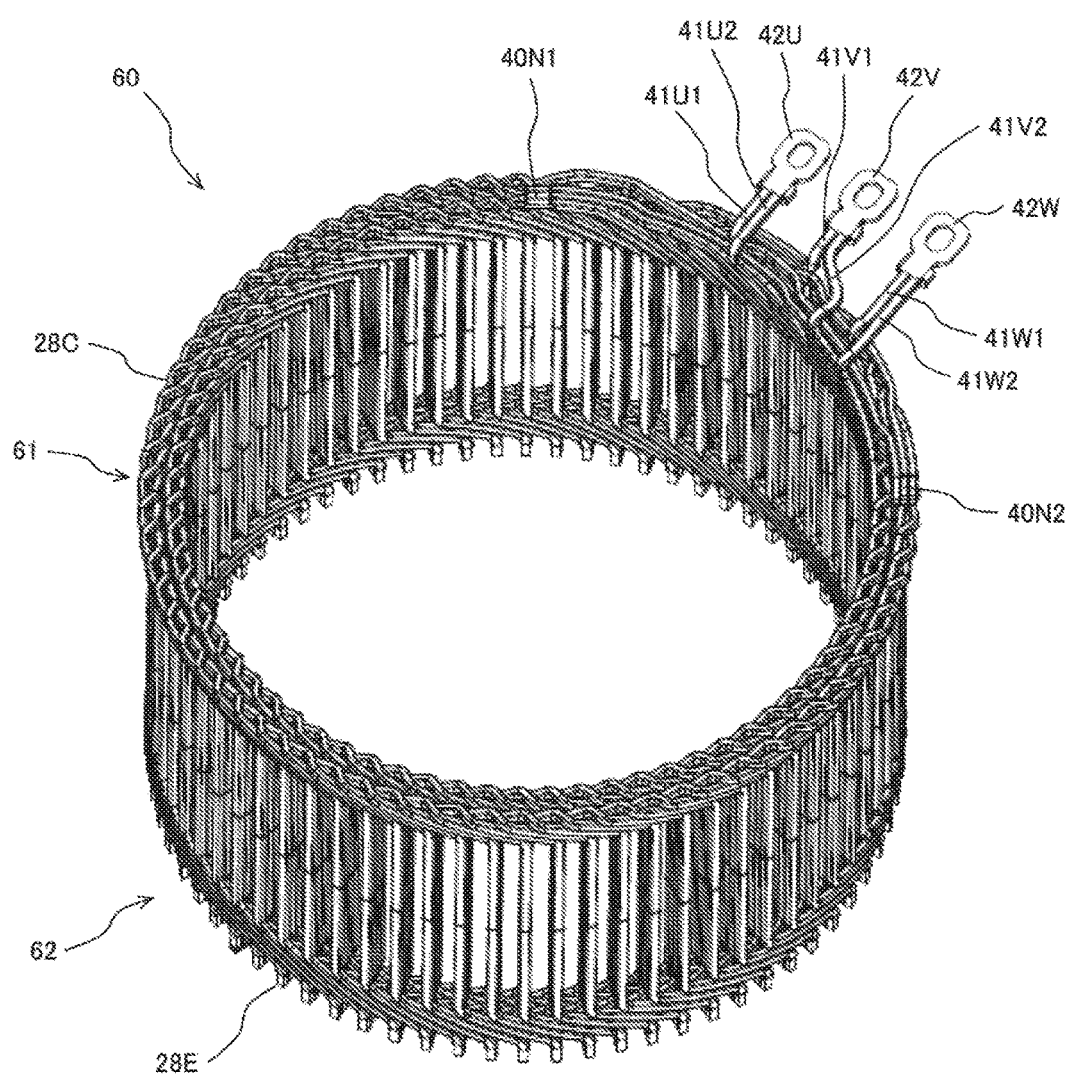
FIG. 5 is an overall perspective view of a stator coil 60.
Figure 6:
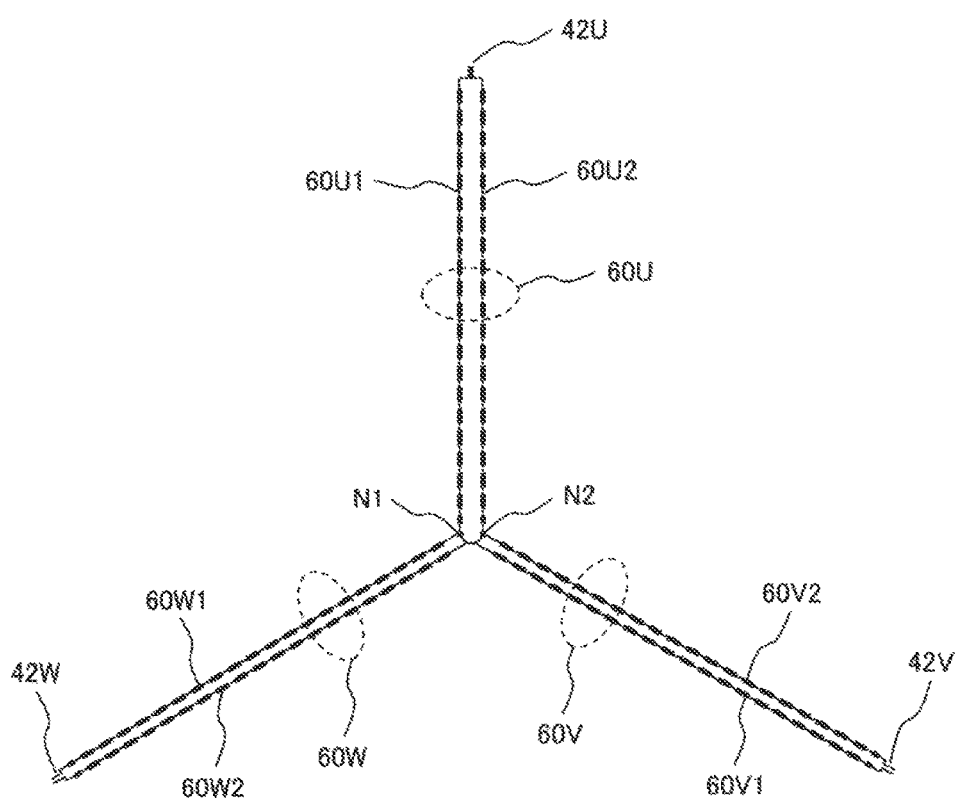
FIG. 6 is a conceptual diagram illustrating a state of connection of a stator coil 60.

FIG. 5 is an overall perspective view of the stator coil 60. FIG. 6 is a conceptual diagram illustrating the state of connection of the stator coil 60. For the stator coil 60 in this embodiment, a stator coil of a two-star configuration in which two star connections shown in FIG. 6 are connected in parallel is adopted. That is, the stator coil 60 includes: a star connection of a U1 phase coil 60U1, a V1 phase coil 60V1, and a W1 phase coil 60W1 and a star connection of a U2 phase coil 60U2, a V2 phase coil 60V2, and a W2 phase coil 60W2. Reference numerals N1 and N2 denote a neutral point of a respective star connection.

The cross-sectional shape of the stator coil 60 may be round or may be rectangular. However, utilizing a section of the interior of each slot 420 effectively as much as possible and adopting such a structure as to reduce the space in each slot tend to lead to efficiency enhancement; therefore, a rectangular section is preferable in terms of efficiency enhancement. With respect to the length of each side of the rectangular section, the stator core 132 may be so set as to be longer in the radial direction or may be conversely so set as to be longer in the circumferential direction.

The stator coil 60 in this embodiment uses a rectangular wire having a rectangular section. The long sides of the rectangular section are aligned in the circumferential direction of the stator core 132 in each slot 420; and the short sides are aligned in the radial direction of the stator core 132. The outer periphery of the rectangular wire is covered with an insulating film. For the stator coil 60, oxygen-free copper or oxygen-containing copper is used. In case of oxygen-containing copper, for example, the oxygen content is between from approximately 10 ppm to 1000 ppm.

Figure 7A:
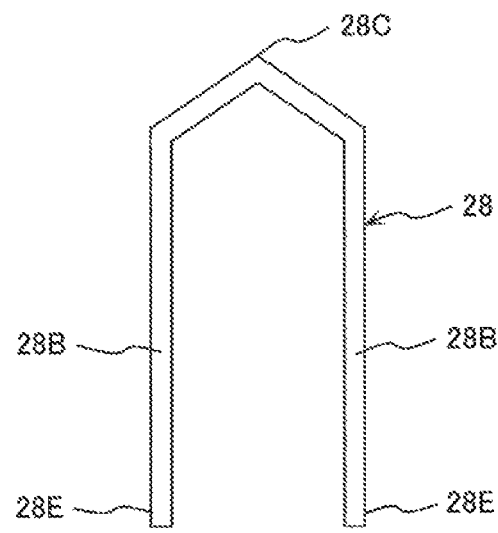
FIG. 7A is a conceptual diagram illustrating a segment conductor 28 constituting a stator coil 60.
Figure 7B:
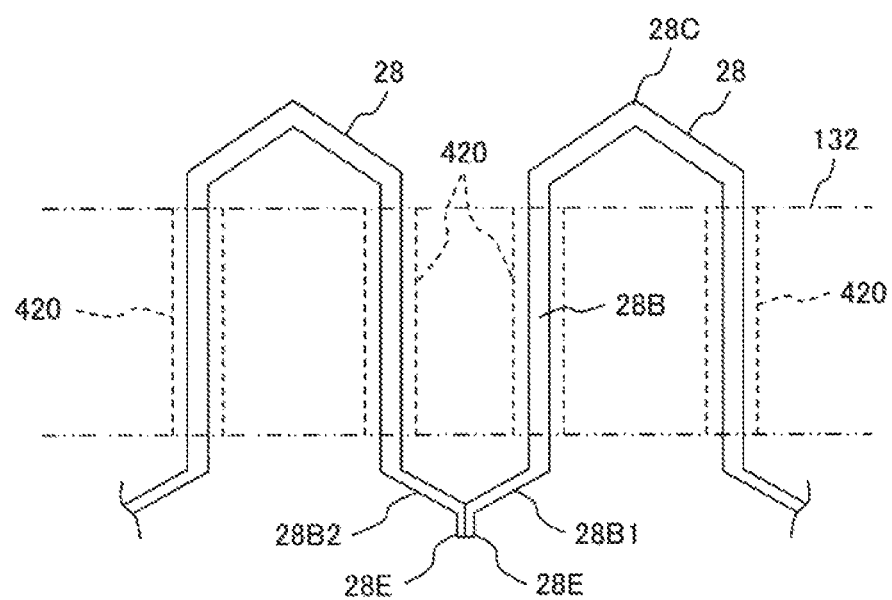
FIG. 7B is a conceptual diagram illustrating segment conductors 28 constituting a stator coil 60.

FIGS. 7A and 7B illustrate segment conductors 28 constituting the stator coil 60. FIG. 7A shows the shape of a segment conductor 28 before attachment to the stator core 132. FIG. 7B shows the shape of each segment conductor 28 after attachment to the stator core 132. Each segment conductor 28 is formed of a rectangular wire into a substantially U shape having a pair of leg portions 28B and a vertex portion 28C coupling the leg portions.

To connect segment conductors 28 to form each phase coil, as shown in FIG. 7B, the paired leg portions 28B of a segment conductor 28 are respectively inserted into different slots 420 from one side of the stator core 132 in the axial direction. Thereafter, the leg portions 28B protruded on the other side of the stator core 132 in the axial direction is folded toward a segment conductor 28 to be connected and the end portion 28E of the leg portion 28B is welded to an end portion 28E of the other segment conductor 28.

The aggregate of the vertex portions 28C protruded on the one side of the stator core 132 constitutes a coil end 61 on the one side of the stator coil 60 shown in FIG. 5. The aggregate of the end portions 28E protruded on the other side of the stator core 132 constitutes a coil end 62 on the other side of the stator coil 60 shown in FIG. 5. Hereafter, the coil end 62 will be referred to as weld-side coil end 62 and the coil end 61 will be referred to as anti-weld-side coil end 61.

As shown in FIG. 5 and FIG. 6, a lead wire 41U1 connected to one end of the U1 phase coil 60U1 and a lead wire 41U2 connected to one end of the U2 phase coil 60U2 are led out on the side of the anti-weld-side coil end 61. The lead wire 41U1 and the lead wire 41U2 are lumped together by an alternating current terminal 42U. Similarly, a lead wire 41V1 and a lead wire 41V2 connected to one ends of the V1 phase coil 60V1 and the V2 phase coil 60V2 are lumped together by an alternating current terminal 42V on the side of the anti-weld-side coil end 61. A lead wire 41W1 and a lead wire 41W2 connected to one ends of the W1 phase coil 60W1 and the W2 phase coil 60W2 are lumped together by an alternating current terminal 42W.

The neutral point connecting conductor 40N1 and the neutral point connecting conductor 40N2 are placed on the side of the anti-weld-side coil end 61. The neutral point connecting conductor 40N1 relates to the neutral point N1

(Refer to FIG. 6) of one star connection and the neutral point connecting conductor 40N2 relates to the neutral point N2 of the other star connection.

The stator coil 60 is wound by a distributed winding method. Distributed winding is a winding method in which a phase winding is wound on the stator core 132 such that the phase winding is housed in two slots 420 separated astride a plurality of slots 420 (Refer to FIG. 3.). This embodiment adopts distributed winding as a winding method; therefore, this embodiment is characterized in that a formed magnetic flux distribution is close to that of a sinusoidal wave as compared with concentrated winding and reluctance torque is prone to be generated. For this reason, in this dynamo-electric machine 10, controllability in field weakening control and control utilizing reluctance torque is enhanced. This makes the dynamo-electric machine 10 usable over a wide number-of-revolution range from low rotational speed to high rotational speed and makes it possible to obtain favorable motor characteristics suitable for electric vehicles.

Figure 8:
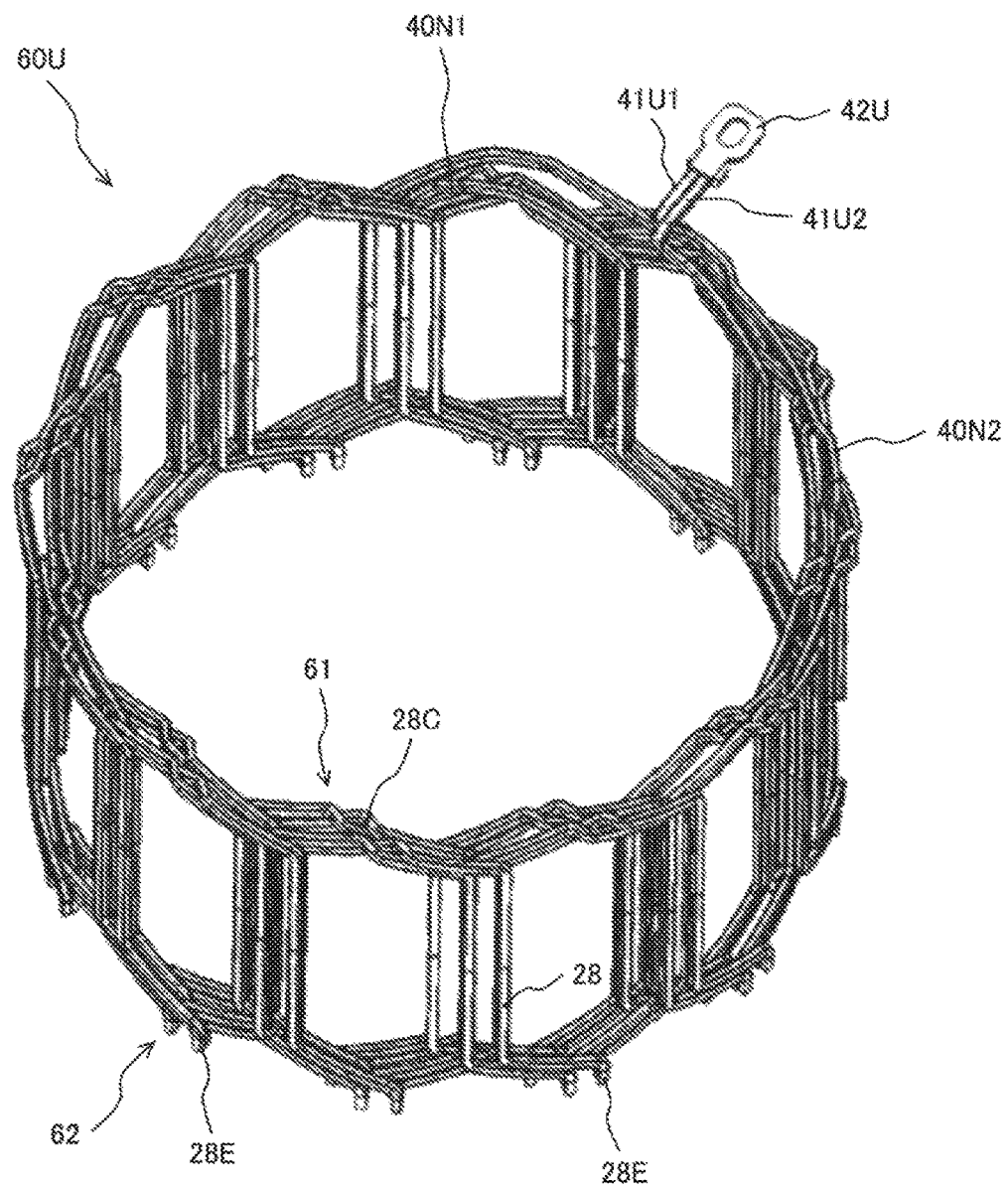
FIG. 8 is a perspective view illustrating a U phase coil 60U equivalent to one phase of the stator coil 60 shown in FIG. 5.
Figure 9:
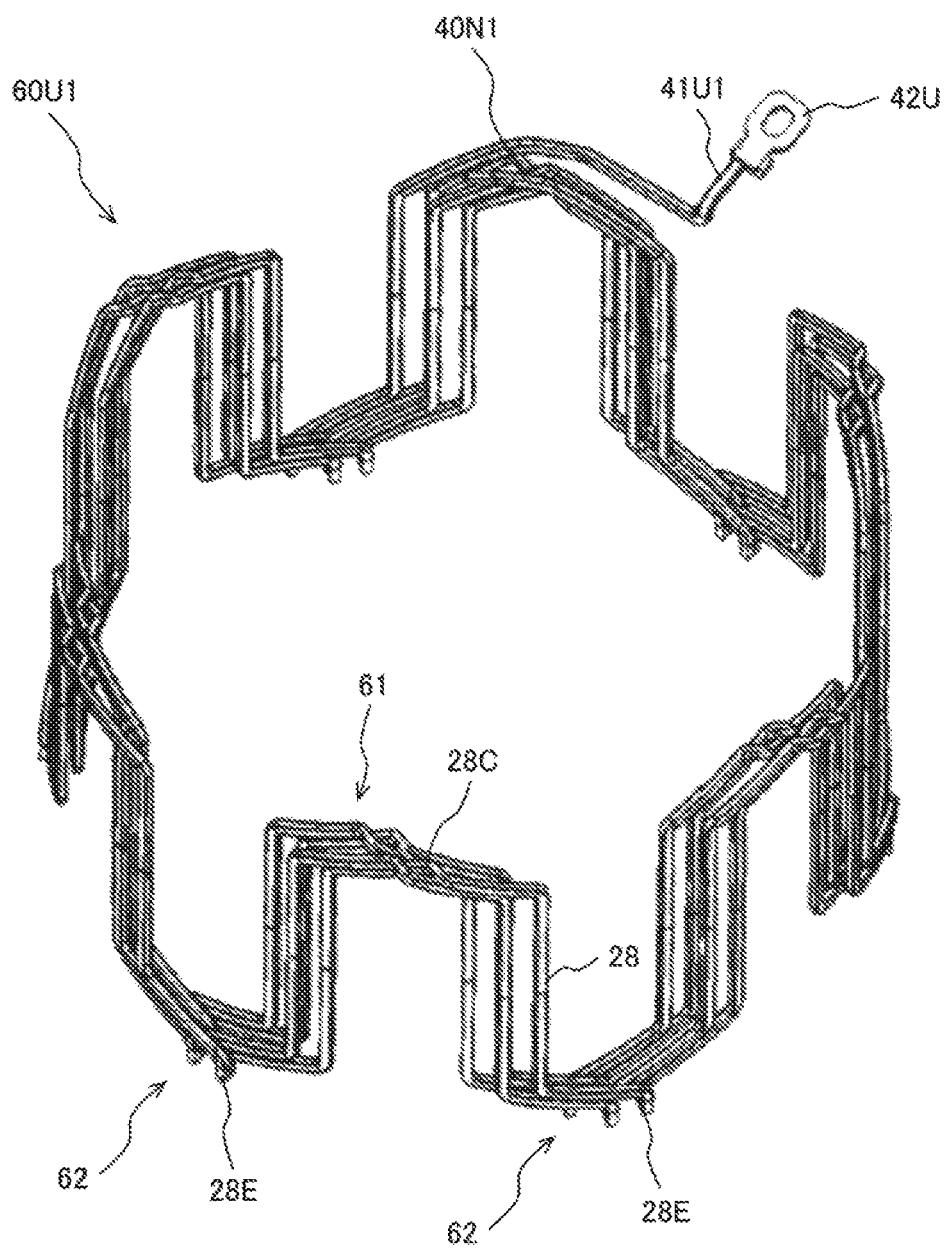
FIG. 9 is a perspective view illustrating a U1 phase coil 60U1, in which a neutral point connecting conductor 40N1 is connected to a second end of the U1 phase coil 60U1.
Figure 10:
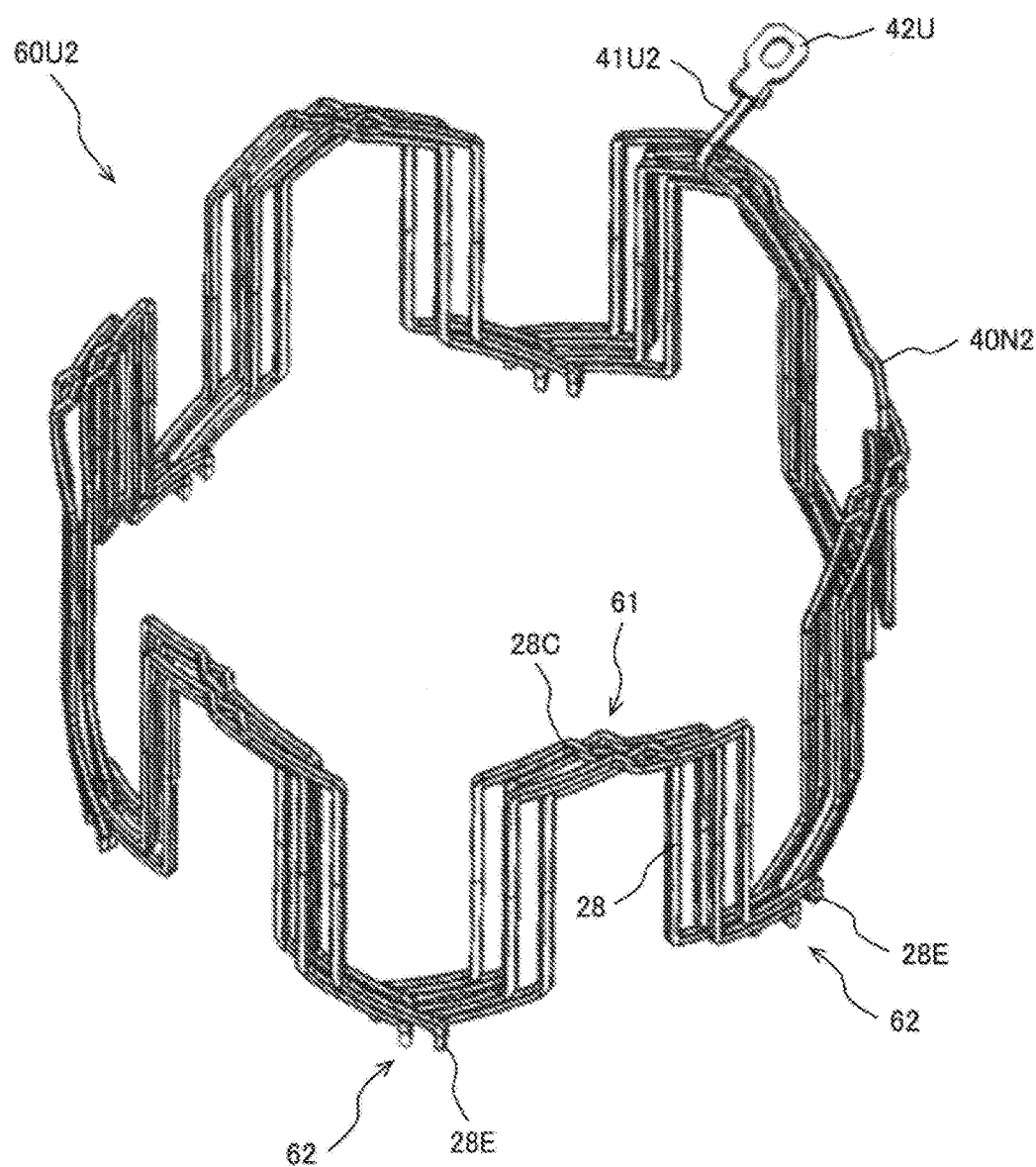
FIG. 10 is a perspective view illustrating a U2 phase coil 60U2, in which a neutral point connecting conductor 40N2 is connected to a second end of the U2 phase coil 60U2.

FIG. 8 is a perspective view illustrating a U phase coil 60U equivalent to one phase of the stator coil 60 shown in FIG. 5. As shown in FIG. 6, the U phase coil 60U is composed of a U1 phase coil 60U1 of one star connection and a U2 phase coil 60U2 of the other star connection. FIG. 9 is a perspective view illustrating the U1 phase coil 60U1. FIG. 10 is a perspective view illustrating the U2 phase coil 60U2. As shown in FIG. 9 and FIG. 10, the neutral point connecting conductor 40N1 is connected to the other end of the U1 phase coil 60U1 and the neutral point connecting conductor 40N2 is connected to the other end of U2 phase coil 60U2

(Manufacturing Method for Stator)
Bending

A description will be given to a manufacturing method for the stator 20 in this embodiment. As mentioned above, after a segment conductor 28 in the state shown in FIG. 7A is inserted into slots in the stator core 132, the leg portions 28B are bent toward other segment conductors 28 to be connected as shown in FIG. 7B. Each leg portion 28B led out of each slot 420 is bent toward a segment conductor 28 to be connected. For example, a leg portion 28B1 protruded from a slot 420 is bent leftward in the circumferential direction. Meanwhile, a leg portion 28B2 having an end portion 28E2 is bent rightward in the circumferential direction. The end portion 28E1 and the end portion 28E2 are arranged adjacently to each other in the radial direction.

Figure 11:
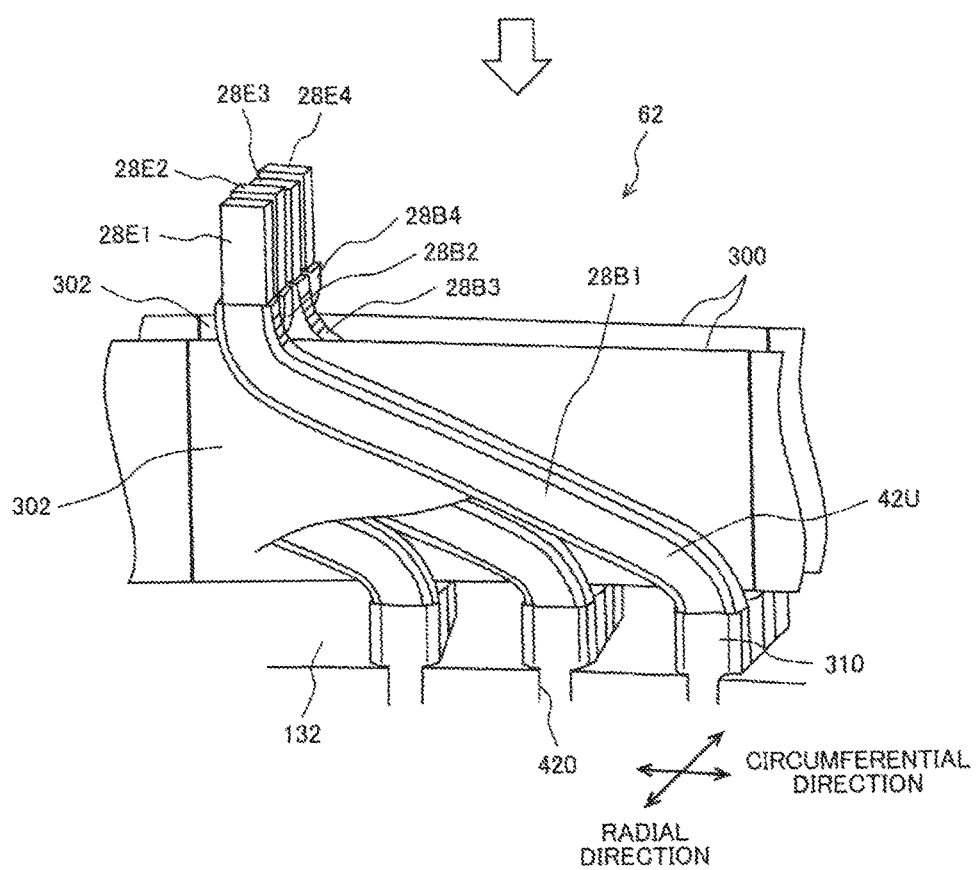
FIG. 11 is a drawing illustrating an end portion 28E1 to an end portion 28E4 of segment conductors 28 in a weld-side coil end 62 after bending.
Figure 12A:
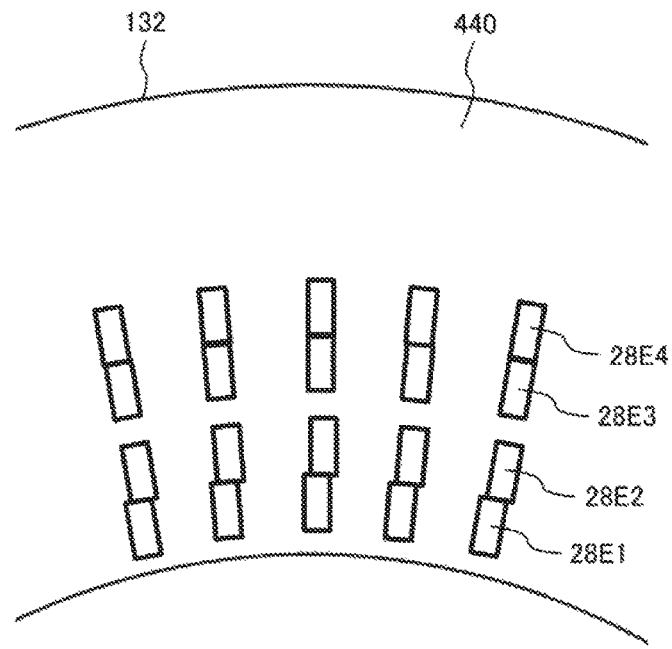
FIG. 12A is a partial enlarged view of a weld-side coil end 62 as viewed from the direction of the arrow in FIG. 11 before the end portion 28E1 to the end portion 28E4 are connected by welding.
Figure 12B:
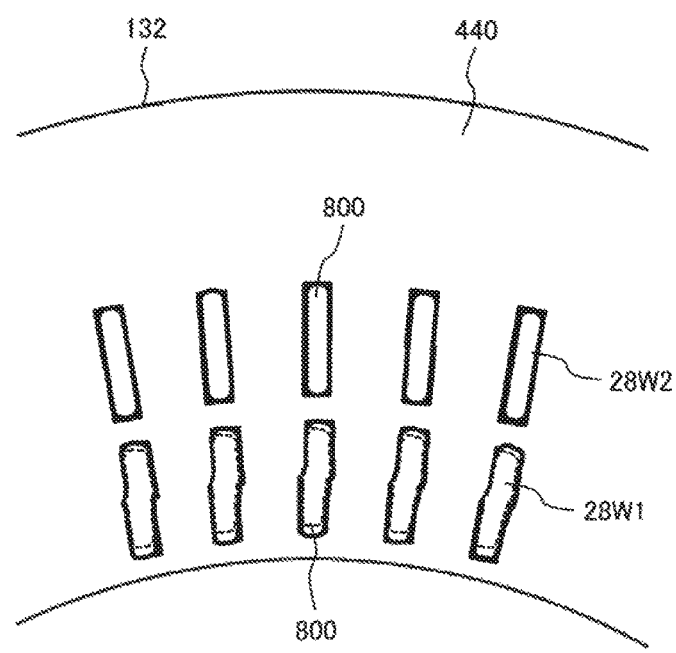
FIG. 12B is a partial enlarged view of a weld-side coil end 62 as viewed from the direction of the arrow in FIG. 11 after the end portion 28E1 to the end portion 28E4 are connected by welding.

FIG. 11 illustrates the end portion 28E1 to the end portion 28E4 of segment conductors 28 at the weld-side coil end 62 after bending. FIG. 12A is a partial enlarged view of the weld-side coil end 62 before an end portion 28E1 to an end portion 28E4 are connected by welding as viewed from the direction of the arrow in FIG. 11. FIG. 12B is a partial enlarged view of the weld-side coil end 62 after the end portion 28E1 to the end portion 28E4 are connected by welding as viewed from the direction of the arrow in FIG. 11.

Segment conductors 28 lined in four rows in the radial direction are inserted into each slot 420. The leg portions 28B inserted into the slots 420 are provided with a slot liner 310. Provision of the slot liners 310 enhances the dielectric voltage between the segment conductors 28 and between each segment conductor 28 and the inner face of a corresponding slot 420. In the end portion 28E1 to the end portion 28E4 to be connected, the insulating film is removed and a conductor is exposed.

The end portion 28E1 to the end portion 28E4 are cut to equalize the height of the tip of each of the end portion 28E1 to the end portion 28E4 and suppress increase in coil end height. When the height of the coil end is uniform, cutting may be omitted.

As shown in FIG. 12A and FIG. 12B, the end portion 28E1 and the end portion 28E2 are connected by welding and the end portion 28E3 and the end portion 28E4 are connected by welding. A welded portion 800 formed by a base material being melted and cured is formed at the end portion 28E1 and the end portion 28E2 and at the end portion 28E3 and the end portion 28E4. For welding, arc welding, TIG welding, plasma welding, or the like is used to melt the base materials of segment conductors 28 and connect the segment conductors. For shielding gas, argon, helium, a mixed gas of argon and helium, or the like is used.

As shown in FIG. 12B, the end portion 28E1 and the end portion 28E2 at the tip portion are displaced from each other and connected to form a junction 28W1. The end portion 28E3 and the end portion 28E4 are also displaced from each other by an amount smaller than in the junction 28W1 on the inner radius side of the stator core and connected to from a junction 28W2.

The junctions 28W1 and 28W2 in this embodiment are formed by welding and one of major stresses exerted on these welded portions 800 is stress produced during temperature rise and temperature fall. Especially, the inner radius side of the stator core is exposed to excessive temperature rise; therefore, when the end portion 28E1 and the end portion 28E2 are largely displaced from each other, a cooling air radially flowing from the central part to the outer radius side of the rotor is prone to be generated and this enhances a cooling effect.

A more specific description will be given. When connection is made such that the displacement in the junction 28W1 is larger than the displacement in the junction 28W2, the surface area of the junction 28W1 is increased by an amount equivalent to the displacement. When the ambient temperature at the junction 28W1 becomes higher than the ambient temperature at the junction 28W2, air flows from the vicinities of the junction 28W1 to the vicinities of the junction 28W2. As a result, cooling air radially flowing from the central part to the outer radius side of the rotor is prone to be generated.

Figure 13A:
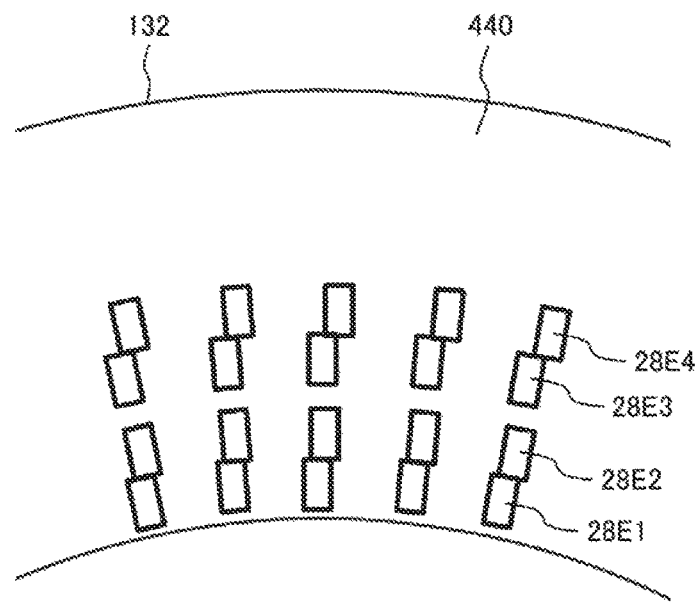
FIG. 13A is a partial enlarged view of a weld-side coil end 62 as viewed from the direction of the arrow in FIG. 11 before the end portion 28E1 to the end portion 28E4 are connected by welding in a different embodiment.
Figure 13B:
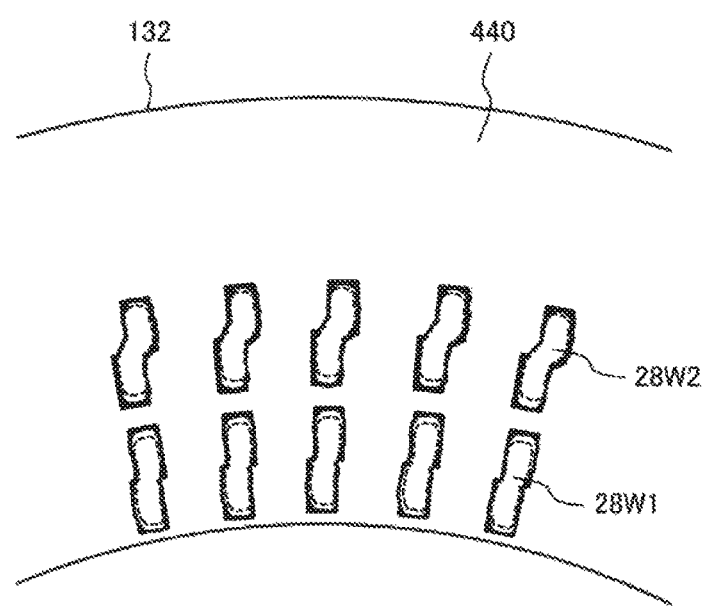
FIG. 13B is a partial enlarged view of a weld-side coil end 62 as viewed from the direction of the arrow in FIG. 11 after the end portion 28E1 to the end portion 28E4 are connected by welding in the different embodiment.

As shown in FIG. 13A and FIG. 13B, the end portion 28E3 and the end portion 28E4 are displaced from each other by an amount larger than the displacement in the junction 28W1 on the inner radius side of the stator core and connected to form the junction 28W2.

One of major stresses exerted on a welded portion as a junction is stress produced during temperature rise and temperature fall. For this reason, it is necessary to cool the welded portion by such liquid refrigerant RF as oil. Especially, since the inner radius side of the stator core is exposed to excessive temperature rise, the end portion 28E3 and the end portion 28E4 on the outer radius side are largely displaced from each other. As a result, the area in contact with such liquid refrigerant RF as oil is increased and a cooling effect is enhanced.

A more specific description will be given. The junction 28W2 is formed such that the surface area thereof is large and thus a large area is ensured for capturing the refrigerant RF. Therefore, when the refrigerant RF flows down from the junction 28W2 to the junction 28W1, much of the refrigerant RF drips from the junction 28W2 to the junction 28W1. As a result, the junction 28W1 located on the inner radius side of the stator core and exposed to high temperature is efficiently cooled.

In bending at the weld-side coil end 62, alignment is easier to perform on the inner radius side and thus stress produced at the junction 28W1 can be reduced by actively cooling the outer radius side.

Figure 14A:
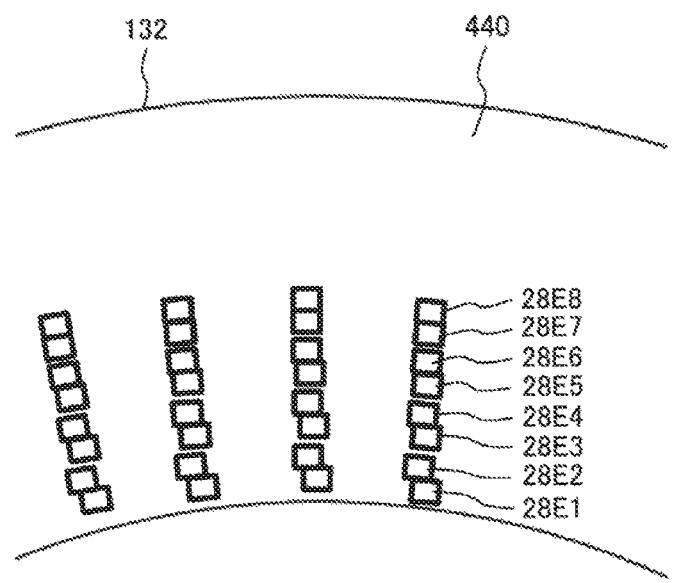
FIG. 14A is a partial enlarged view of a weld-side coil end 62 as viewed from the direction of the arrow in FIG. 11 before the end portion 28E1 to the end portion 28E8 are connected by welding in a different embodiment.
Figure 14B:
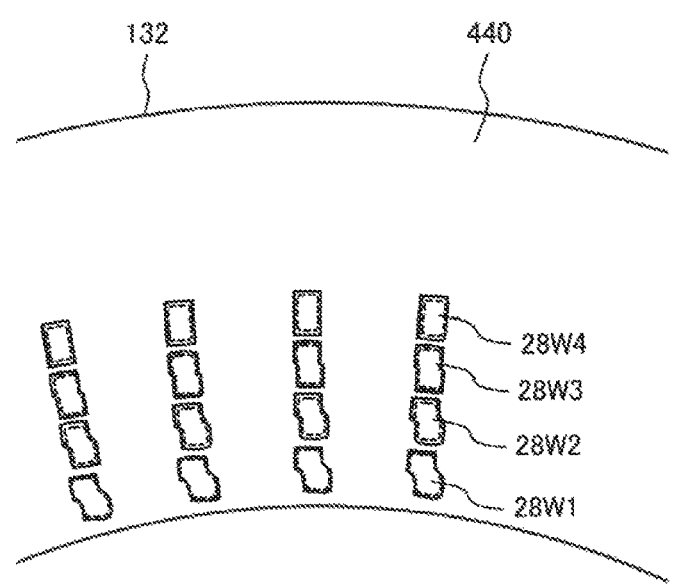
FIG. 14B is a partial enlarged view of a weld-side coil end 62 as viewed from the direction of the arrow in FIG. 11 after the end portion 28E1 to the end portion 28E8 are connected by welding in the different embodiment.

As shown in FIG. 14A and FIG. 14B, an end portion 28E3 and an end portion 28E4, an end portion 28E5 and an end portion 28E6, and an end portion 28E7 and an end portion 28E8 are connected such that the displacement therebetween is increased as it goes closer to the inner radius side of the stator core. Junctions 28W1 to 28W4 in this embodiment are formed by welding and one of major stresses produced when these end portions are welded is stress produced during temperature rise and temperature fall. Especially, the inner radius side of the stator core is exposed to excessive temperature rise. To cope with this, the displacement between end portions is increased as it goes closer to the inner radius side of the stator core. Thus, cooling air radially flowing from the central part to the outer radius side of the rotor is prone to be generated and a cooling effect is enhanced.

Figure 15A:
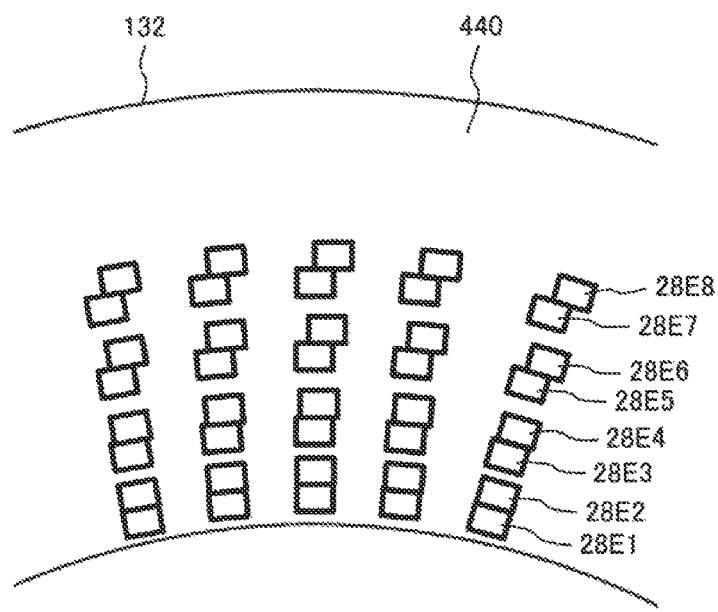
FIG. 15A is a partial enlarged view of a weld-side coil end 62 as viewed from the direction of the arrow in FIG. 11 before the end portion 28E1 to the end portion 28E8 are connected by welding in a different embodiment.
Figure 15B:
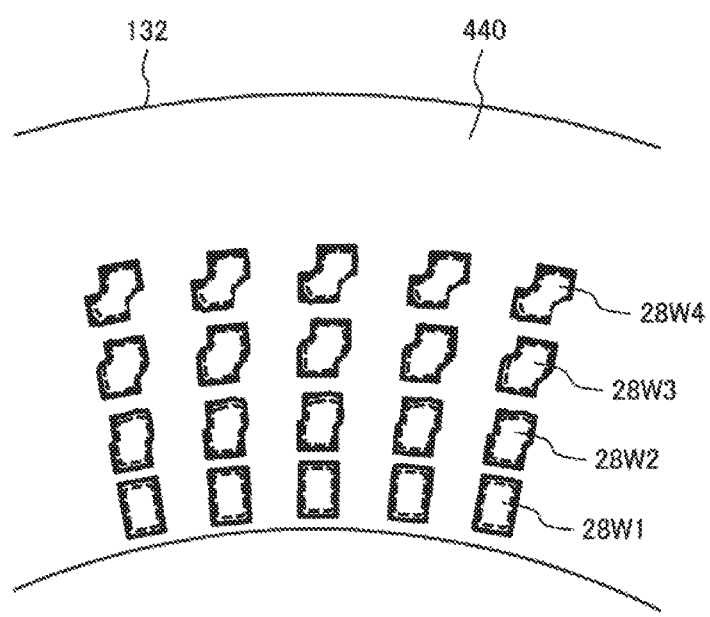
FIG. 15B is a partial enlarged view of a weld-side coil end 62 as viewed from the direction of the arrow in FIG. 11 after the end portion 28E1 to the end portion 28E8 are connected by welding in the different embodiment.

As shown in FIG. 15A and FIG. 15B, an end portion 28E3 and an end portion 28E4, an end portion 28E5 and an end portion 28E6, and an end portion 28E7 and an end portion 28E8 are connected such that the displacement therebetween is increased as it goes closer to the outer radius side of the stator core.

Junctions 28W1 to 28W4 in this embodiment are formed by welding and one of stresses produced when these end portions are welded is stress produced during temperature rise and temperature fall. For this reason, it is required to cool the junctions 28W1 to 28W4 by such liquid refrigerant RF as oil. Especially, since the inner radius side of the stator core is exposed to excessive temperature rise, the end portions are connected such that the displacement therebetween is increased as it goes closer to the outer radius side of the stator core. As a result, the area in contact with such liquid refrigerant RF as oil is increased and a cooling effect is enhanced.

In bending at the weld-side coil end 62, alignment is easier to perform on the inner radius side and thus stress produced at the welded portions can be reduced by actively cooling the outer radius side.

According to the above-mentioned embodiments, the following working effect is obtained:

One of stresses exerted on a welded portion as a junction is stress produced during temperature rise and temperature fall. According to the above-mentioned embodiments, the quality of cooling of the welded portion by such liquid refrigerant RF as oil or cooling air is enhanced. For this reason, the welding area of the welded portion can be reduced and a welding current can be reduced. As a result, damage to an enamel coating can also be reduced and insulation quality is enhanced. Since stress on the welded portion can be reduced and a target of welding can be welded as is displaced from a different target, aligning operation before welding can be simplified.

As described up to this point, according to the present invention, a stator of a dynamo-electric machine of small size and high output but excellent in coolability can be provided.

Up to this point, a description has been given to various embodiments and modifications but the present invention is not limited to these embodiments or modifications. Any other mode possible within the scope of the technical idea of the present invention is also included in the scope of the present invention.

DESCRIPTION OF THE REFERENCE NUMERALS AND SIGNS

10 - - - Dynamo-electric machine
11 - - - Rotor
12 - - - Rotor core
13 - - - Shaft
18 - - - Permanent magnet
20 - - - Stator
28 - - - Segment conductor
28B - - - Leg portion
28C - - - Vertex portion
28E - - - End portion
28E1 to 28E4 - - - End portion
28W1 - - - Junction
28W2 - - - Junction
40N1 - - - Neutral point connecting conductor
40N2 - - - Neutral point connecting conductor
41U1 - - - Lead wire
41U2 - - - Lead wire
41V1 - - - Lead wire
41V2 - - - Lead wire
41W1 - - - Lead wire
41W2 - - - Lead wire
42U - - - Alternating current terminal
42V - - - Alternating current terminal
42W - - - Alternating current terminal
50 - - - Housing
60 - - - Stator coil
60U - - - U phase coil
60U1 - - - U1 phase coil
60U2 - - - U2 phase coil
60V1 - - - V1 phase coil
60V2 - - - V2 phase coil
60W1 - - - W1 phase coil
60W2 - - - W2 phase coil
61 - - - Anti-weld-side coil end
62 - - - Weld-side coil end
130 - - - Liquid-cooled jacket
132 - - - Stator core
144 - - - Bearing
145 - - - Bearing
150 - - - Refrigerant storage space
153 - - - Refrigerant passage
154 - - - Refrigerant passage
155 - - - Refrigerant passage
156 - - - Magnetic gap
160 - - - Auxiliary magnetic pole
200 - - - Welded portion
310 - - - Slot liner
420 - - - Slot
430 - - - Tooth
440 - - - Core back
800 - - - Welded portion
810 - - - Magnet insertion hole
BAT - - - Battery
ENG - - - Engine
FW - - - Front driving wheel
INV - - - Power converter
N1 - - - Neutral point
N2 - - - Neutral point
TR - - - Transmission
RF - - - Refrigerant
RW - - - Rear driving wheel

What is claimed is:

1. A stator of a dynamo-electric machine, comprising:
a stator core with a plurality of slots formed in alignment in the circumferential direction; and
a stator coil with an insulating film inserted into the slots in the stator core,
wherein the stator coil is composed of a first-layer segment to a fourth-layer segment each of which is formed by arranging a plurality of segment coils in the circumferential direction and which are arranged from the inner radius side to the outer radius side in the radial direction,
wherein the first-layer segment and the second-layer segment are displaced from each other by a first amount of displacement in the circumferential direction and connected to each other, and
wherein the third-layer segment and the fourth-layer segment are displaced from each other by a second amount of displacement different from the first amount of displacement in the circumferential direction and connected to each other.

2. The stator of a dynamo-electric machine according to claim 1,
wherein the stator coil uses a gas refrigerant, and
wherein the first amount of displacement is larger than the second amount of displacement.

3. The stator of a dynamo-electric machine according to claim 1,
wherein the stator coil uses a liquid refrigerant, and
wherein the second amount of displacement is larger than the first amount of displacement.

4. A dynamo-electric machine provided with the stator according to claim 1, comprising:
a rotor rotatably placed in the stator core with a predetermined gap in between.

5. A dynamo-electric machine provided with the stator according to claim 2, comprising:
a rotor rotatably placed in the stator core with a predetermined gap in between.

6. A dynamo-electric machine provided with the stator according to claim 3, comprising:
a rotor rotatably placed in the stator core with a predetermined gap in between.

* * * * *